US010279687B2

United States Patent
Kobayashi et al.

(10) Patent No.: US 10,279,687 B2
(45) Date of Patent: May 7, 2019

(54) CONTROL DEVICE FOR VEHICLE DRIVE DEVICE

(71) Applicant: AISIN AW CO., LTD., Anjo-shi, Aichi-ken (JP)

(72) Inventors: Hirokazu Kobayashi, Anjo (JP); Keiichirou Kusabe, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 120 days.

(21) Appl. No.: 15/517,797

(22) PCT Filed: Sep. 30, 2015

(86) PCT No.: PCT/JP2015/077867
§ 371 (c)(1),
(2) Date: Apr. 7, 2017

(87) PCT Pub. No.: WO2016/084474
PCT Pub. Date: Jun. 2, 2016

(65) Prior Publication Data
US 2017/0305277 A1    Oct. 26, 2017

(30) Foreign Application Priority Data

Nov. 27, 2014  (JP) ................................ 2014-240099

(51) Int. Cl.
*B60K 6/48*     (2007.10)
*B60L 11/14*    (2006.01)
(Continued)

(52) U.S. Cl.
CPC ............ *B60L 11/126* (2013.01); *B60K 6/387* (2013.01); *B60K 6/46* (2013.01); *B60K 6/48* (2013.01);
(Continued)

(58) Field of Classification Search
None
See application file for complete search history.

(56) References Cited

U.S. PATENT DOCUMENTS 5,491,635 A * 2/1996 Foeldi ................... B60W 10/02
                                                    192/3.3
6,041,276 A * 3/2000 John ..................... B60W 10/02
                                                    180/197
(Continued)

FOREIGN PATENT DOCUMENTS

JP    2005-221073 A    8/2005
JP    2006-306207 A    11/2006
(Continued)

OTHER PUBLICATIONS

Dec. 22, 2015 Search Report issued in International Patent Application No. PCT/JP2014/077867.

*Primary Examiner* — Colby M Hansen
(74) *Attorney, Agent, or Firm* — Oliff PLC

(57) ABSTRACT

A control device that includes an electronic control unit that is programmed such that, when the internal combustion engine is started by the rotary electric machine while output torque from the rotary electric machine is transferred to the wheels in a state in which rotation of the internal combustion engine has been stopped, the electronic control unit: executes second slipping control in which the second engagement device is controlled into a slipping engagement state, executes first slipping control in which the first engagement device which has been in a disengaged state is controlled into a slipping engagement state during execution of the second slipping control, and controls an engagement pressure of the first engagement device so as to lower a rotational speed of the rotary electric machine in the first slipping control.

8 Claims, 7 Drawing Sheets

(51) Int. Cl.
  *B60W 10/02* (2006.01)
  *B60W 10/06* (2006.01)
  *B60W 10/08* (2006.01)
  *F16D 48/02* (2006.01)
  *B60K 6/46* (2007.10)
  *B60W 20/40* (2016.01)
  *B60L 11/12* (2006.01)
  *B60K 6/387* (2007.10)
  *B60K 6/543* (2007.10)
  *B60K 6/54* (2007.10)
  *B60W 20/00* (2016.01)

(52) U.S. Cl.
  CPC .............. *B60K 6/543* (2013.01); *B60L 11/14* (2013.01); *B60W 10/02* (2013.01); *B60W 10/06* (2013.01); *B60W 10/08* (2013.01); *B60W 20/40* (2013.01); *F16D 48/02* (2013.01); *B60K 6/54* (2013.01); *B60K 2006/4825* (2013.01); *B60W 10/026* (2013.01); *B60W 20/00* (2013.01); *B60W 2710/027* (2013.01); *B60W 2710/081* (2013.01); *Y02T 10/6221* (2013.01); *Y02T 10/6252* (2013.01); *Y02T 10/6286* (2013.01)

(56) References Cited

U.S. PATENT DOCUMENTS

| | | | |
|---|---|---|---|
| 6,655,485 B1* | 12/2003 | Ito | B60W 20/40 180/65.6 |
| 9,283,956 B2* | 3/2016 | Matsui | F02D 41/123 |
| 2005/0155803 A1 | 7/2005 | Schiele | |
| 2008/0017427 A1* | 1/2008 | Nakanowatari | B60K 6/365 180/65.235 |
| 2008/0245332 A1* | 10/2008 | Rimaux | B60K 6/48 123/179.24 |
| 2012/0083385 A1 | 4/2012 | Smith et al. | |
| 2015/0051767 A1 | 2/2015 | Mohri | |

FOREIGN PATENT DOCUMENTS

| | | |
|---|---|---|
| JP | 2009-512589 A | 3/2009 |
| JP | 2010-202153 A | 9/2010 |
| JP | 2014-073747 A | 4/2014 |
| JP | 2014-101051 A | 6/2014 |
| WO | 2013/077161 A1 | 5/2013 |

\* cited by examiner

CONTROL DEVICE FOR VEHICLE DRIVE DEVICE

BACKGROUND

The present disclosure relates to a control device that controls a vehicle drive device in which a first engagement device, a rotary electric machine, and a second engagement device are provided in a power transfer path that connects between an internal combustion engine and wheels and arranged in this order from an internal combustion engine side.

A technology described in Japanese Patent Application Publication No. 2014-73747 mentioned below, for example, is already known as the control device described above. In the technology of Japanese Patent Application Publication No. 2014-73747, in order to start the internal combustion engine, the first engagement device is controlled into a slipping engagement state to transfer output torque from the rotary electric machine to the internal combustion engine via the first engagement device to raise the rotational speed of the internal combustion engine.

SUMMARY

In the technology of Japanese Patent Application Publication No. 2014-73747, however, in an electric mode (EV mode) in which the vehicle travels using the rotary electric machine as a drive force source for the wheels with the internal combustion engine disconnected from the wheels, it is necessary to always secure torque required to start the internal combustion engine separately from torque to be transferred to the wheels. Therefore, torque that can be transferred from the rotary electric machine to the wheels in the electric mode must be brought to torque that is lower than maximum torque that can be output from the rotary electric machine by the torque required to start the internal combustion engine, and the torque region in which the electric mode is executable is set to be accordingly narrower.

An exemplary aspect of the disclosure provides a control device for a vehicle drive device that is capable of widening the torque region in which the electric mode is executable.

An exemplary aspect of the disclosure includes a control device that controls a vehicle drive device in which a first engagement device, a rotary electric machine, and a second engagement device are provided in a power transfer path that connects between an internal combustion engine and wheels and arranged in this order from an internal combustion engine side, the control device includes an electronic control unit that is programmed such that, when the internal combustion engine is started by the rotary electric machine while output torque from the rotary electric machine is transferred to the wheels in a state in which rotation of the internal combustion engine has been stopped, the electronic control unit: executes second slipping control in which the second engagement device is controlled into a slipping engagement state, executes first slipping control in which the first engagement device which has been in a disengaged state is controlled into a slipping engagement state during execution of the second slipping control, and controls an engagement pressure of the first engagement device so as to lower a rotational speed of the rotary electric machine in the first slipping control.

With the characteristic configuration described above, the rotational speed of the rotary electric machine is lowered through the first slipping control during execution of the second slipping control. Inertia torque as a reaction force against the reduction in rotational speed of the rotary electric machine is transferred to the internal combustion engine side via the first engagement device. That is, torque that is larger than the output torque from the rotary electric machine can be transferred to the internal combustion engine side by converting the rotational energy of the rotary electric machine into torque and transferring the torque to the internal combustion engine side. Thus, it is possible to accordingly reduce torque of the rotary electric machine which needs to be secured separately from torque to be transferred to the wheels as torque required to start the internal combustion engine. Consequently, it is possible to secure large torque that can be transferred from the rotary electric machine to a wheel side during execution of the electric mode. Accordingly, it is possible to extend the torque region in which the electric mode is executable.

DETAILED DESCRIPTION OF EMBODIMENTS

1. Embodiment

Figure 1:
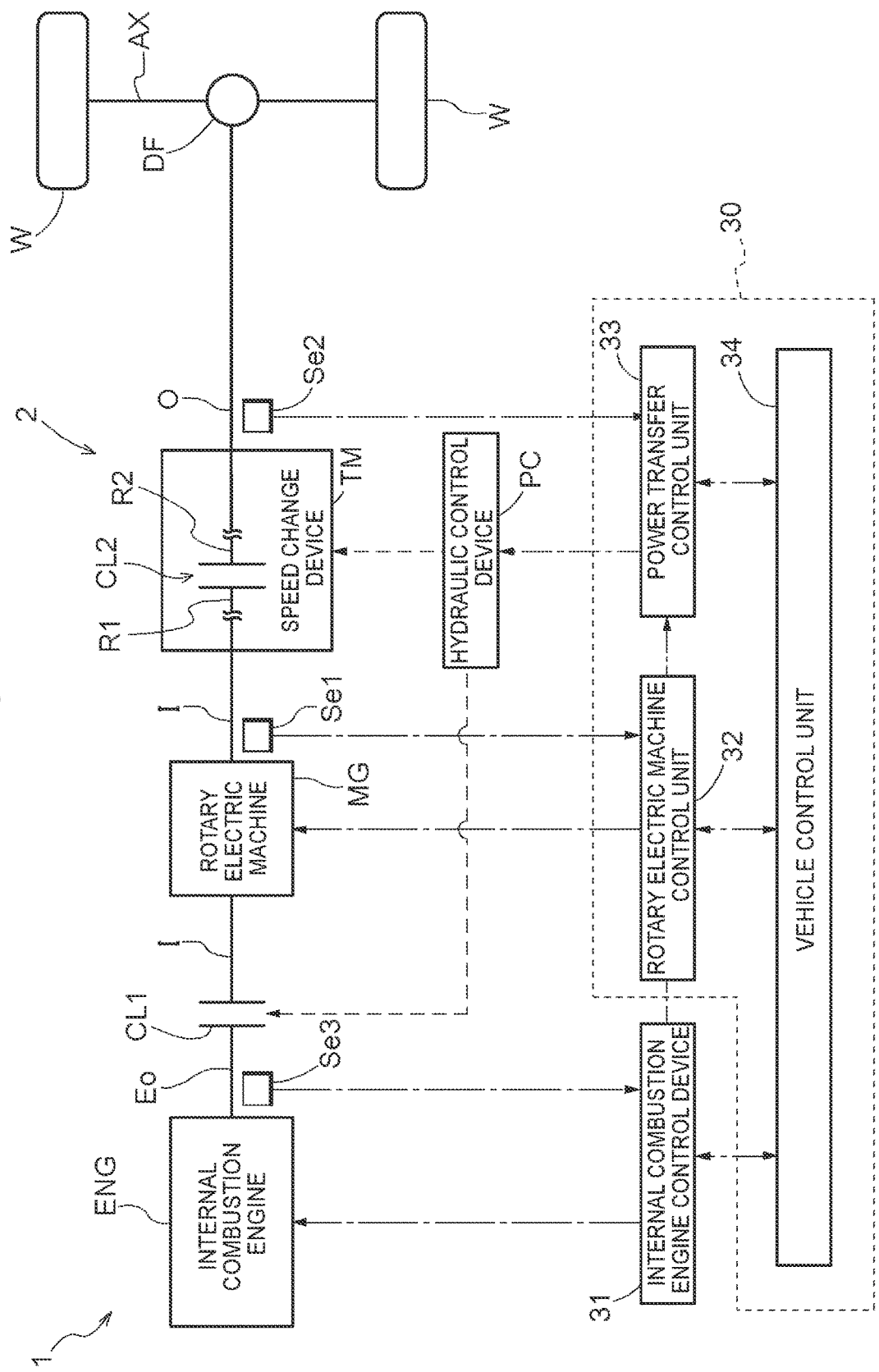
FIG. 1 is a schematic diagram illustrating a schematic configuration of a vehicle drive device and a control device according to an embodiment.

A control device 30 for a vehicle drive device 1 (hereinafter referred to simply as a "control device 30") according to an embodiment will be described with reference to the drawings. FIG. 1 is a schematic diagram illustrating a schematic configuration of the vehicle drive device 1 and the control device 30 according to the embodiment. In the drawing, the solid lines each indicate a drive force transfer path, the broken lines each indicate a working oil supply path, and the dash-dotted lines each indicate a signal transfer path. As illustrated in the drawing, the vehicle drive device 1 according to the embodiment is generally configured to include an internal combustion engine ENG and a rotary electric machine MG as drive force sources, and to transfer drive forces of the drive force sources to wheels W via a power transfer mechanism. In the vehicle drive device 1, a first engagement device CL1, the rotary electric machine MG, and a second engagement device CL2 are provided in a power transfer path 2 that connects between the internal combustion engine ENG and the wheels W, and arranged in this order from the internal combustion engine ENG side.

In the vehicle drive device 1 according to the embodiment, a speed change device TM is provided in a portion of the power transfer path 2 between the rotary electric machine MG and the wheels W. The second engagement device CL2 is one of a plurality of engagement devices provided in the speed change device TM.

The term "rotary electric machine" as used herein refers to any of a motor (electric motor), a generator (electric generator), and a motor generator that functions both as a motor and as a generator as necessary.

A hybrid vehicle includes the control device 30 which controls the vehicle drive device 1. The control device 30 according to the embodiment includes a rotary electric machine control unit 32 that controls the rotary electric machine MG, a power transfer control unit 33 that controls the speed change device TM, the first engagement device CL1, and the second engagement device CL2, and a vehicle control unit 34 that integrates these control devices to control the vehicle drive device 1. The hybrid vehicle also includes an internal combustion engine control device 31 that controls the internal combustion engine ENG.

Figure 2:
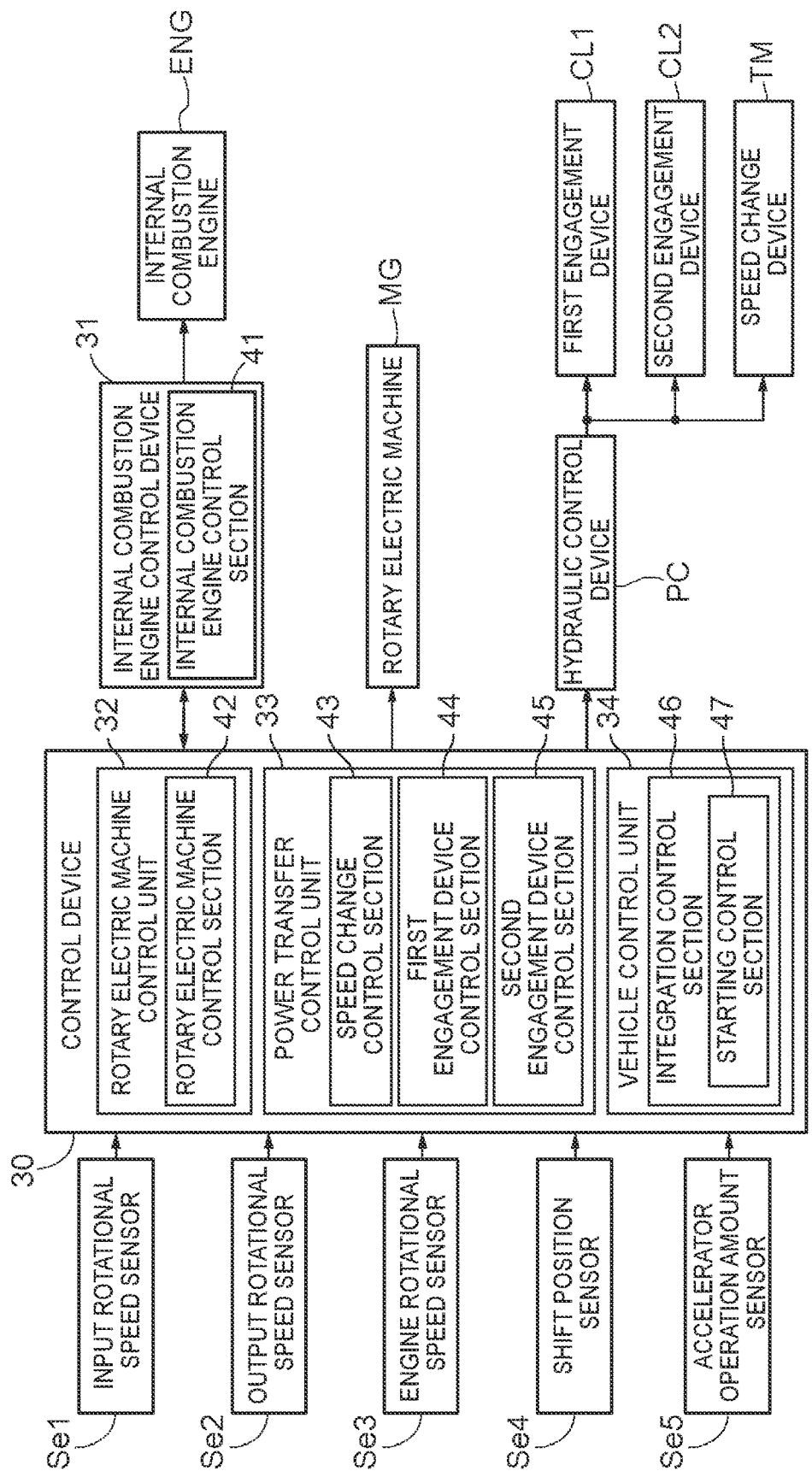
FIG. 2 is a block diagram illustrating a schematic configuration of the control device according to the embodiment.

As illustrated in FIG. 2, the control device 30 includes functional sections such as a starting control section 47 that performs starting control for the internal combustion engine ENG.

The starting control section 47 executes second slipping control in which the second engagement device CL2 is controlled into a slipping engagement state when executing acceleration starting control in which the internal combustion engine ENG is started by the rotary electric machine MG while transferring output torque from the rotary electric machine MG to the wheels W in a state in which rotation of the internal combustion engine ENG has been stopped. The starting control section 47 executes first slipping control in which the first engagement device CL1 which has been in a disengaged state is controlled into a slipping engagement state during execution of the second slipping control. The starting control section 47 controls the engagement pressure of the first engagement device CL1 so as to lower the rotational speed of the rotary electric machine MG in the first slipping control.

The vehicle drive device 1 and the control device 30 according to the embodiment will be described in detail below.

1-1. Configuration of Vehicle Drive Device 1

First, the configuration of the vehicle drive device 1 of the hybrid vehicle according to the embodiment will be described. As illustrated in FIG. 1, the hybrid vehicle is a parallel-type hybrid vehicle which includes the internal combustion engine ENG and the rotary electric machine MG as drive force sources for the vehicle, and in which the internal combustion engine ENG and the rotary electric machine MG are drivably coupled in series with each other. The hybrid vehicle includes the speed change device TM, which transfers rotation of the internal combustion engine ENG and the rotary electric machine MG transferred to an input shaft I to an output shaft O with the rotational speed changed and with torque converted.

The term "drivably coupled" as used herein refers to a state in which two rotary elements are coupled to each other in such a way that allows transfer of a drive force, which includes a state in which the two rotary elements are coupled so as to rotate together with each other, and a state in which the two rotary elements are coupled to each other via one or two or more transmission members in such a way that allows transfer of a drive force. Examples of such transmission members include various members that transfer rotation at an equal speed or a changed speed, such as a shaft, a gear mechanism, a belt, and a chain. Additional examples of such transmission members include engagement devices that selectively transfer rotation and a drive force, such as a friction engagement device and a meshing-type engagement device.

The internal combustion engine ENG is a heat engine driven by combustion of fuel. Various internal combustion engines known in the art such as gasoline engines and diesel engines, for example, may be used as the internal combustion engine ENG. In the example, an internal combustion engine output shaft Eo such as a crankshaft of the internal combustion engine ENG is selectively drivably coupled to the input shaft I via the first engagement device CL1.

The rotary electric machine MG has a stator fixed to a case that serves as a non-rotary member and a rotor rotatably supported at a position corresponding to the stator. The rotor of the rotary electric machine MG is drivably coupled so as to rotate together with the input shaft I. That is, in the embodiment, both the internal combustion engine ENG and the rotary electric machine MG are drivably coupled to the input shaft I. The rotary electric machine MG is electrically connected to a battery that serves as an electricity accumulation device via an inverter that performs a DC/AC conversion. The rotary electric machine MG can function as a motor (electric motor) that is supplied with electric power to produce power and as a generator (electric generator) that is supplied with power to generate electric power. That is, the rotary electric machine MG performs power running using electric power supplied from the battery via the inverter, or generates electric power using a rotational drive force transferred from the internal combustion engine ENG or the wheels W. The generated electric power is accumulated in the battery via the inverter.

The speed change device TM is drivably coupled to the input shaft I. In the embodiment, the speed change device TM is a stepped automatic speed change device that provides a plurality of shift speeds with different speed ratios. In order to establish the plurality of shift speeds, the speed change device TM includes a gear mechanism such as a planetary gear mechanism and a plurality of engagement devices. In the embodiment, one of the plurality of engagement devices is the second engagement device CL2. In the example, the second engagement device CL2 is a clutch. In FIG. 1, in addition, a rotary member that rotates together with an engagement member of the second engagement device CL2 closer to the rotary electric machine MG is denoted by reference symbol "R1" as a first rotary member, and a rotary member that rotates together with an engagement member of the second engagement device CL2 closer to the wheels W is denoted by reference symbol "R2" as a second rotary member. The first rotary member R1 may be any rotary member that is closer to the rotary electric machine MG than the second engagement device CL2 with no other engagement device interposed between the second engagement device CL2 and the first rotary member R1. Similarly, the second rotary member R2 may be any rotary member that is closer to the wheels W than the second engagement device CL2 with no other engagement device interposed between the second engagement device CL2 and the second rotary member R2.

The speed change device TM transfers rotation of the input shaft I to the output shaft O with the rotational speed changed based on the speed ratio of each shift speed and with torque converted. The torque transferred from the speed change device TM to the output shaft O is distributed and transferred to two, left and right, axles AX via a differential gear device DF to be transferred to the wheels W which are drivable coupled to the axles AX. Here, the term "speed ratio" refers to the ratio of the rotational speed of the input shaft I to the rotational speed of the output shaft O in the case where each shift speed is established in the speed change device TM. The term "speed ratio" as used herein refers to a value obtained by dividing the rotational speed of the input shaft I by the rotational speed of the output shaft O. That is, the rotational speed of the output shaft O is obtained by dividing the rotational speed of the input shaft I by the speed ratio. In addition, the torque transferred from the speed change device TM to the output shaft O is obtained by multiplying torque transferred from the input shaft I to the speed change device TM by the speed ratio.

In the example, the plurality of engagement devices (second engagement device CL2) of the speed change device TM and the first engagement device CL1 are each a friction engagement element such as a clutch and a brake configured to include friction members. Each of the friction engagement elements can be continuously controlled such that the transfer torque capacity of the friction engagement element is increased and decreased by controlling the engagement pressure of the friction engagement element by controlling the supplied hydraulic pressure. A wet multi-plate clutch and a wet multi-plate brake, for example, may be suitably used as the friction engagement elements.

A friction engagement element transfers torque between the engagement members of the friction engagement element through friction between the engagement members. In the case where there is a difference in rotational speed (slipping) between the engagement members of the friction engagement element, torque (slip torque) corresponding to the magnitude of the transfer torque capacity is transferred from a member with a higher rotational speed to a member with a lower rotational speed through dynamic friction. In the case where there is no difference in rotational speed (slipping) between the engagement members of the friction engagement element, torque which is up to the magnitude of the transfer torque capacity and is acting between the engagement members of the friction engagement element is transferred through static friction. Here, the term "transfer torque capacity" refers to the magnitude of maximum torque that can be transferred by a friction engagement element through friction. The magnitude of the transfer torque capacity is varied in proportion to the engagement pressure of the friction engagement element. The term "engagement pressure" refers to a pressure (or a force) that presses an input-side engagement member (friction plate) and an output-side engagement member (friction plate) against each other. In the embodiment, the engagement pressure is varied in proportion to the magnitude of the supplied hydraulic pressure. That is, in the embodiment, the magnitude of the transfer torque capacity is varied in proportion to the magnitude of the hydraulic pressure supplied to the friction engagement element.

Each of the friction engagement elements includes a return spring, and is urged to be disengaged by the reaction force of the spring. When a force produced by the hydraulic pressure supplied to a hydraulic cylinder of the friction engagement element exceeds the reaction force of the spring, the friction engagement element starts producing a transfer torque capacity to bring the friction engagement element from the disengaged state into the engaged state. The hydraulic pressure at which the transfer torque capacity starts being produced is referred to as a "stroke end pressure". Each of the friction engagement elements is configured such that the transfer torque capacity of the friction engagement element is increased in proportion to an increase in supplied hydraulic pressure after the hydraulic pressure exceeds the stroke end pressure. The friction engagement elements may not be provided with a return spring, and may be structured to be controlled in accordance with a difference between the hydraulic pressures applied to both sides of a piston of the hydraulic cylinder.

In the embodiment, the term "engaged state" refers to a state in which a friction engagement element is producing a transfer torque capacity. The engaged state includes a slipping engagement state and a direct engagement state. The term "disengaged state" refers to a state in which a friction engagement element is not producing a transfer torque capacity. The term "slipping engagement state" refers to an engaged state in which there is a difference in rotational speed (slipping) between the engagement members of a friction engagement element. The term "direct engagement state" refers to an engaged state in which there is no difference in rotational speed (slipping) between the engagement members of a friction engagement element. The term "non-direct engagement state" refers to an engagement state other than the direct engagement state, and includes the disengaged state and the slipping engagement state.

In the friction engagement elements, there is a case where a transfer torque capacity is produced by dragging between the engagement members (friction members) even when the control device 30 is not providing a command to produce a transfer torque capacity. For example, a transfer torque capacity may be produced by dragging between the friction members which may contact each other even if the friction members are not pressed against each other by the piston. Thus, the term "disengaged state" also includes a state in which a transfer torque capacity is produced by dragging between the friction members when the control device 30 is not providing a friction engagement device with a command to produce a transfer torque capacity.

1-2. Configuration of Hydraulic Control System

The hydraulic control system of the vehicle drive device 1 includes a hydraulic control device PC that adjusts the hydraulic pressure of working oil supplied from a hydraulic pump driven by the drive force source for the vehicle or a dedicated motor to a predetermined pressure. Although not described in detail here, the hydraulic control device PC adjusts the operation amount of one or two or more adjustment valves on the basis of a signal pressure from a hydraulic control valve such as a linear solenoid valve for hydraulic pressure adjustment to adjust the amount of the working oil to be drained from the adjustment valves, thereby adjusting the hydraulic pressure of the working oil to one or two or more predetermined pressures. After being adjusted to the predetermined pressure, the working oil is supplied to each of the friction engagement elements such as those of the speed change device TM and the first engagement device CL1, the second engagement device CL2, and so forth at a hydraulic pressure required by the friction engagement element.

1-3. Configuration of Control Device

Next, the configuration of the control device 30 which controls the vehicle drive device 1 and the internal combustion engine control device 31 will be described with reference to FIG. 2.

The control units 32 to 34 of the control device 30 and the internal combustion engine control device 31 each include an arithmetic processing unit (computer) such as a CPU that serves as a core member, a storage device such as a RAM (random access memory) configured to read and write data from and into the arithmetic processing unit and a ROM (read only memory) configured to read data from the arithmetic processing unit, and so forth. Functional sections 41 to 47 of the control device 30 etc. are formed by software (a program) stored in the ROM of the control device or the like, hardware such as a separately provided arithmetic circuit, or a combination of both. The control units 32 to 34 of the control device 30 and the internal combustion engine control device 31 are configured to communicate with each other, and perform cooperative control while sharing various types of information such as information detected by sensors and control parameters, thereby implementing the functions of the functional sections 41 to 47.

The vehicle drive device 1 includes sensors such as sensors Se1 to Se5, and an electrical signal output from the sensors is input to the control device 30 and the internal combustion engine control device 31. The control device 30 and the internal combustion engine control device 31 calculate information detected by the sensors on the basis of the input electrical signal. An input rotational speed sensor Se1 is a sensor that detects the rotational speed of the input shaft I. The control device 30 detects the rotational speed (angular speed) of the input shaft I on the basis of a signal input from the input rotational speed sensor Se1. An output rotational speed sensor Se2 is a sensor that detects the rotational speed of the output shaft O. The control device 30 detects the rotational speed (angular speed) of the output shaft O on the basis of a signal input from the output rotational speed sensor Se2. The rotational speed of the output shaft O is proportional to the vehicle speed. Therefore, the control device 30 calculates the vehicle speed on the basis of a signal input from the output rotational speed sensor Se2. An engine rotational speed sensor Se3 is a sensor that detects the rotational speed of the internal combustion engine output shaft Eo (internal combustion engine ENG). The internal combustion engine control device 31 detects the rotational speed (angular speed) of the internal combustion engine ENG on the basis of a signal input from the engine rotational speed sensor Se3.

A shift position sensor Se4 is a sensor that detects the selected position (shift position) of a shift lever operated by a driver. The control device 30 detects the shift position on the basis of a signal input from the shift position sensor Se4. The shift lever is operable to select a parking range (P range), a reverse travel range (R range), a neutral range (range), a forward travel range (D range), and so forth.

An accelerator operation amount sensor Se5 is a sensor configured to detect the operation amount of an accelerator pedal. The control device 30 detects the accelerator operation amount on the basis of a signal input from the acceleration operation amount sensor Se5.

1-3-1. Internal Combustion Engine Control Device 31

The internal combustion engine control device 31 includes an internal combustion engine control section 41 that controls operation of the internal combustion engine ENG. In the embodiment, in the case where a command for internal combustion engine required torque is provided from an integration control section 46, the internal combustion engine control section 41 performs torque control in which the internal combustion engine ENG is controlled so as to output the internal combustion engine required torque.

In the case where the internal combustion engine is requested to start combustion, the internal combustion engine control section 41 performs control so as to start combustion of the internal combustion engine ENG by starting supply of fuel to the internal combustion engine ENG, ignition of the internal combustion engine ENG, and so forth. In the case where a command to stop rotation of the internal combustion engine ENG is provided from the integration control section 46 or the like, the internal combustion engine control section 41 brings the internal combustion engine ENG into a non-rotating state by stopping supply of fuel to the internal combustion engine ENG, ignition of the internal combustion engine ENG, or the like.

1-3-2. Rotary Electric Machine Control Unit 32

The rotary electric machine control unit 32 includes a rotary electric machine control section 42 that controls operation of the rotary electric machine MG. In the embodiment, in the case where a command for rotary electric machine required torque is provided from the integration control section 46, the rotary electric machine control section 42 performs control such that the rotary electric machine MG outputs the rotary electric machine required torque. Specifically, the rotary electric machine control section 42 performs control so as to turn on and off a plurality of switching elements provided in the inverter to control the output torque from the rotary electric machine MG.

1-3-3. Power Transfer Control Unit 33

The power transfer control unit 33 includes a speed change control section 43 that controls the speed change device TM, a first engagement device control section 44 that controls the first engagement device CL1, and a second engagement device control section 45 that controls the second engagement device CL2.

1-3-3-1. Speed Change Control Section 43

The speed change control section 43 controls establishment of a shift speed in the speed change device TM. The speed change control section 43 decides a target shift speed for the speed change device TM on the basis of information detected by the sensors such as the vehicle speed, the accelerator operation amount, and the shift position. The speed change control section 43 controls the hydraulic pressure to be supplied to the plurality of engagement devices provided in the speed change device TM via the hydraulic control device PC to engage or disengage the engagement devices in order to establish the target shift speed in the speed change device TM. Specifically, the speed change control section 43 provides the hydraulic control device PC with a command for a target hydraulic pressure (hydraulic pressure command) for the engagement devices, and the hydraulic control device PC supplies the engagement devices with a hydraulic pressure at the target hydraulic pressure (hydraulic pressure command) according to the command. In the embodiment, the speed change control section 43 is configured to control a hydraulic pressure to be supplied to the engagement devices by controlling a signal value to be supplied to the hydraulic control valves provided in the hydraulic control device PC.

1-3-3-2. First Engagement Device Control Section 44

The first engagement device control section 44 controls the state of engagement of the first engagement device CL1. In the embodiment, the first engagement device control section 44 controls a signal value to be supplied to the hydraulic control valves provided in the hydraulic control device PC such that the hydraulic pressure to be supplied to the first engagement device CL1 coincides with a hydraulic pressure command for the first engagement device CL1 provided from the integration control section 46.

1-3-3-3. Second Engagement Device Control Section 45

The second engagement device control section 45 controls the state of engagement of the second engagement device CL2. In the embodiment, the second engagement device control section 45 controls a signal value to be supplied to the hydraulic control valves provided in the hydraulic control device PC such that the hydraulic pressure to be supplied to the second engagement device CL2 coincides with a hydraulic pressure command for the second engagement device CL2 provided from the integration control section 46.

1-3-4. Vehicle Control Unit 34

The vehicle control unit 34 includes the integration control section 46. The integration control section 46 includes the starting control section 47.

1-3-4-1. Integration Control Section 46

The integration control section 46 controls integration of various torque control performed on the internal combustion engine ENG, the rotary electric machine MG, the speed change device TM, the first engagement device CL1, the second engagement device CL2, and so forth, engagement control for the engagement devices, and so forth over the entire vehicle.

The integration control section 46 calculates vehicle required torque, which is torque required to drive the wheels W and which is a target drive force to be transferred from the drive force source side to the wheel W side, and decides the drive mode of the internal combustion engine ENG and the rotary electric machine MG, in accordance with the accelerator operation amount, the vehicle speed, the charge amount of the battery, and so forth. The drive mode includes an electric mode in which the vehicle travels using the rotary electric machine MG as the drive force source for the wheels W with the internal combustion engine ENG disconnected from the wheels W, and a parallel mode in which the vehicle travels using at least the internal combustion engine ENG as the drive force source. For example, the drive mode is decided as the electric mode in the case where the accelerator operation amount is small and the charge amount of the battery is large, and the drive mode is decided as the parallel mode in the other cases, that is, in the case where the accelerator operation amount is large or the charge amount of the battery is small. In the embodiment, the electric mode is a mode in which the vehicle travels using only the rotary electric machine MG as the drive force source for the wheels W. In general, such an electric mode is referred to also as an EV (electric vehicle) mode.

The integration control section 46 calculates the internal combustion engine required torque which is output torque required for the internal combustion engine ENG, the rotary electric machine required torque which is output torque required for the rotary electric machine MG, a hydraulic pressure command which is a target for a hydraulic pressure to be supplied to the first engagement device CL1, and a hydraulic pressure command which is a target for a hydraulic pressure to be supplied to the second engagement device CL2 on the basis of the vehicle required torque, the drive mode, the charge amount of the battery, and so forth, and provides the calculated values to the other control sections 41 to 45 to perform integration control. In the case where acceleration starting control is performed, the starting control section 47 calculates the internal combustion engine required torque, the rotary electric machine required torque, a hydraulic pressure command for the first engagement device CL1, and a hydraulic pressure command for the second engagement device CL2, and provides the calculated values to the other control sections 41 to 45.

1-3-4-2. Starting Control Section 47
1-3-4-2-1. Acceleration Starting Control The starting control section executes second slipping control in which the second engagement device CL2 is controlled into a slipping engagement state when executing acceleration starting control in which the internal combustion engine ENG is started by the rotary electric machine MG while transferring output torque from the rotary electric machine MG to the wheels W in a state in which rotation of the internal combustion engine ENG has been stopped. The starting control section 47 controls the rotary electric machine MG such that torque in the direction of rotating the wheels W in the forward direction is transferred via the second engagement device CL2 during execution of the second slipping control. In order to achieve such torque transfer by the second engagement device CL2, the starting control section 47 controls the rotary electric machine MG such that, in the case where the rotational speed of the first rotary member R1 closer to the rotary electric machine MG than the second engagement device CL2 and the rotational speed of the second rotary member R2 closer to the wheels W than the second engagement device CL2 are converted into rotational speeds of the same rotary member, the rotational speed of the first rotary member R1 is brought to a rotational speed that is higher than the rotational speed of the second rotary member R2 during execution of the second slipping control. In other words, the starting control section 47 controls the rotary electric machine MG such that the rotational speed of the rotary electric machine MG is brought to a rotational speed that is higher than a synchronous rotational speed which is a rotational speed of the rotary electric machine MG at which the second engagement device CL2 has no rotational speed difference. In the embodiment, the starting control section 47 executes rotational speed control in which the rotary electric machine MG is controlled so as to bring the rotational speed of the rotary electric machine MG closer to a target rotational speed which is higher than the synchronous rotational speed during execution of the second slipping control. In addition, the starting control section 47 executes first slipping control in which the first engagement device CL1 which has been in a disengaged state is controlled into a slipping engagement state during execution of the second slipping control.

The expression "torque in the direction of rotating the wheels W in the forward direction" refers to torque in the same direction as the rotational direction of the wheels W with the vehicle traveling forward. The feature that torque in such a direction is "transferred via the second engagement device CL2" indicates that torque in such a direction when transferred to the wheels W is transferred via the second engagement device CL2. The expression "converted into rotational speeds of the same rotary member" refers to converting the rotational speeds of the first rotary member R1 and the second rotary member R2 into rotational speeds at the same position (rotary member) in the power transfer path in consideration of the speed ratio of the power transfer mechanism between the rotary members. For example, in the case where a speed change mechanism such as a gear mechanism is provided between the first rotary member R1 and the second rotary member R2, the rotational speeds of both the first rotary member R1 and the second rotary member R2 can be converted into rotational speeds of the same rotary member by multiplying the rotational speed of one of the rotary members by the speed ratio of the speed change mechanism.

In the acceleration starting control, the second engagement device CL2 is controlled into a slipping engagement state in order to suppress transfer of torque fluctuations due to the start of the internal combustion engine ENG to the wheels W via the second engagement device CL2. The second engagement device CL2 is also controlled into a slipping engagement state in order to raise the rotational speed of the rotary electric machine MG to be equal to or more than a rotational speed of the internal combustion engine ENG at which the internal combustion engine ENG can be started in the case where the vehicle speed is low. In the slipping engagement state, torque (slip torque) that matches the transfer torque capacity (engagement pressure) of the second engagement device CL2 is transferred from the rotary electric machine MG side to the wheel W side via the second engagement device CL2. That is, torque transferred from the rotary electric machine MG side to the wheel W side is slip torque that matches the transfer torque capacity (engagement pressure) of the second engagement device CL2 irrespective of torque fluctuations caused on the internal combustion engine ENG side.

In the acceleration starting control, in addition, torque is transferred from the rotary electric machine MG side to the internal combustion engine ENG side by controlling the first engagement device CL1 into a slipping engagement state in order to raise the rotational speed of the internal combustion engine ENG. In the slipping engagement state, torque (slip torque) that matches the transfer torque capacity (engagement pressure) of the first engagement device CL1 is transferred from the rotary electric machine MG side to the internal combustion engine ENG side via the first engagement device CL1. That is, slip torque transferred from the rotary electric machine MG side to the internal combustion engine ENG side is torque that matches the transfer torque capacity (engagement pressure) of the first engagement device CL1.

<Maximum Torque Excess Control>

In order to suppress fluctuations in rotational speed of the rotary electric machine MG, it is conceivable to control the output torque from the rotary electric machine MG such that the total slip torque of the slip torque (absolute value) of the second engagement device CL2 and the slip torque (absolute value) of the first engagement device CL1 is balanced with the output torque from the rotary electric machine MG. Therefore, it is conceivable that the output torque from the rotary electric machine MG is obtained by increasing the torque transferred to the wheel W side via the second engagement device CL2 by an amount corresponding to an increase in slip torque of the first engagement device CL1. In the case where the accelerator operation amount is large and the output torque from the rotary electric machine MG transferred to the wheel W side via the second engagement device CL2 is large, however, the allowance for increasing the output torque from the rotary electric machine MG for slip torque to be transferred to the internal combustion engine ENG side via the first engagement device CL1 may be small with respect to maximum torque Tmgmx of the rotary electric machine MG. In order to advance the start of the internal combustion engine ENG, however, it is desirable to increase slip torque to be transferred to the internal combustion engine ENG via the first engagement device CL1 as much as possible.

Thus, the starting control section 47 controls the engagement pressure of the first engagement device CL1 so as to lower the rotational speed of the rotary electric machine in the first slipping control. To this end, in the embodiment, the starting control section 47 is configured to execute maximum torque excess control, in which the engagement pressure of the first engagement device CL1 is controlled such that the first engagement device CL1 transfers torque that is larger than torque (hereinafter referred to as "extra torque") obtained by subtracting transfer torque (absolute value) (hereinafter referred to also as "slip torque of the second engagement device CL2") transferred from the rotary electric machine MG side to the wheel W side via the second engagement device CL2 in a slipping engagement state from the maximum torque Tmgmx which can be output from the rotary electric machine MG from the rotary electric machine MG side to the internal combustion engine ENG side in the first slipping control. Here, the maximum torque Tmgmx of the rotary electric machine MG is the maximum value in the range of torque to be output under drive conditions in normal drive.

In this way, the total slip torque transferred from the rotary electric machine MG side to the internal combustion engine ENG side and the wheel W side via the first and second engagement devices CL1 and CL2 exceeds the maximum torque Tmgmx of the rotary electric machine MG, which makes the output torque from the rotary electric machine MG insufficient. Consequently, the rotational speed of the rotary electric machine MG is lowered in the first slipping control. In return, torque due to the inertia of the rotary electric machine MG is transferred to the internal combustion engine ENG side via the first engagement device CL1. Consequently, it is possible to increase the transfer torque to be transferred to the side of the internal combustion engine ENG side. That is, the rotational energy of the rotary electric machine MG can be converted into torque, and transferred to the internal combustion engine ENG side. Thus, it is possible to accordingly reduce torque of the rotary electric machine MG which needs to be secured separately from torque to be transferred to the wheels W as torque required to start the internal combustion engine ENG. Consequently, it is possible to secure large torque that can be transferred from the rotary electric machine MG to the wheel W side during execution of the electric mode. Accordingly, it is possible to extend the torque region in which the electric mode is executable.

In addition, the internal combustion engine ENG can be started earlier while maintaining acceleration of the vehicle by increasing the transfer torque to be transferred to the internal combustion engine ENG side by use of inertia torque as a reaction force against a reduction in rotational speed of the rotary electric machine MG. That is, the internal combustion engine ENG can be started earlier with torque that exceeds the limit of the output performance of the rotary electric machine MG transferred to the internal combustion engine ENG side by use of the inertia of the rotary electric machine MG by increasing torque to be transferred to the internal combustion engine ENG side via the first engagement device CL1 until the output torque from the rotary electric machine MG is insufficient so that the rotational speed of the rotary electric machine MG is lowered.

If the slip torque to be transferred to the internal combustion engine ENG side is increased via the first engagement device CL1 without limitation, meanwhile, the rotational speed of the rotary electric machine MG is lowered significantly. When the rotational speed of the rotary electric machine MG is lowered to the synchronous rotational speed, the second engagement device CL2 transitions to a direct engagement state. When the second engagement device CL2 transitions to a direct engagement state, torque fluctuations are transferred to the wheels W. Thus, the starting control section 47 is configured to control the engagement pressure of the first engagement device CL1 within a range in which the rotational speed of the rotary electric machine MG can be maintained at a rotational speed that is higher than the synchronous rotational speed.

As insufficient torque for the rotary electric machine MG calculated by subtracting the maximum torque Tmgmx of the rotary electric machine MG from the total slip torque (absolute value) of the first and second engagement devices CL1 and CL2 is larger, the rotational speed of the rotary electric machine MG is lowered by a larger amount. Thus, the starting control section 47 is configured to increase the engagement pressure of the first engagement device CL1 such that the insufficient torque for the rotary electric machine MG is brought to allowable insufficient torque set in advance. The allowable insufficient torque has been set in advance through an experiment or the like to a value at which the rotational speed of the rotary electric machine MG can be maintained at a rotational speed that is higher than the synchronous rotational speed. The starting control section 47 increases the engagement pressure of the first engagement device CL1 such that the magnitude of torque obtained by adding the allowable insufficient torque set in advance to extra torque obtained by subtracting the slip torque (absolute value) of the second engagement device CL2 from the maximum torque Tmgmx of the rotary electric machine MG is brought to the transfer torque capacity of the first engagement device CL1. The starting control section 47 calculates the maximum torque Tmgmx of the rotary electric machine MG on the basis of drive conditions such as the rotational speed of the rotary electric machine MG and the amount of charge of the battery using the output characteristics of the rotary electric machine MG. In addition, the starting control section 47 calculates slip torque of the second engagement device CL2 in accordance with the engagement pressure of the second engagement device CL2. In the example, the starting control section 47 calculates vehicle required torque as slip torque of the second engagement device CL2.

<Timing Chart According to Comparative Example>

Figure 3:
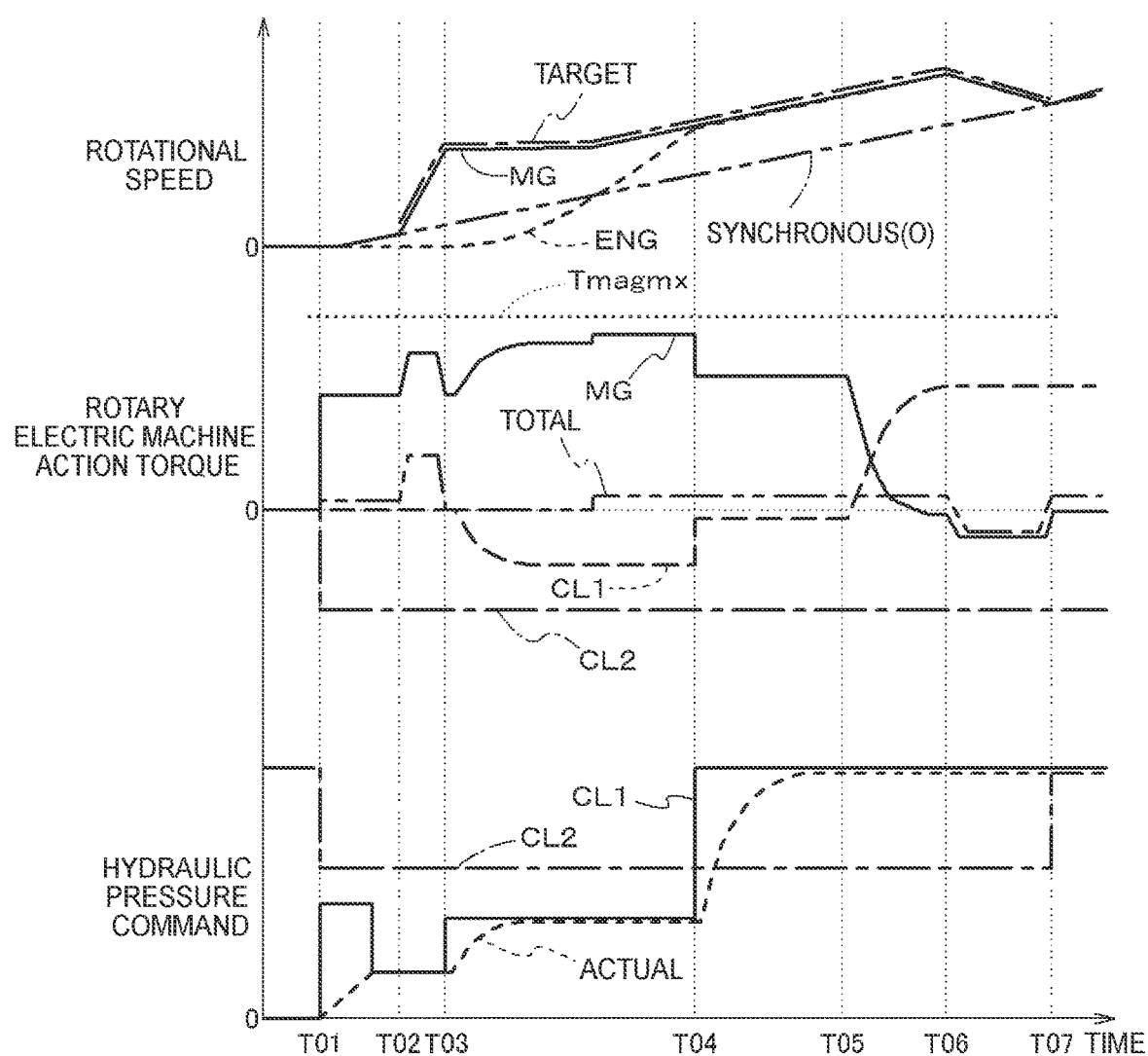
FIG. 3 is a timing chart illustrating the control behavior during starting control for an internal combustion engine according to a comparative example.

FIG. 3 illustrates a timing chart of a comparative example. In the example of FIG. 3, unlike the embodiment, in control in which the first engagement device CL1 is controlled into a slipping engagement state, the engagement pressure of the first engagement device CL1 is controlled such that the first engagement device CL1 transfers torque that is smaller than extra torque obtained by subtracting slip torque (absolute value) of the second engagement device CL2 from the maximum torque Tmgmx of the rotary electric machine MG from the rotary electric machine MG side to the internal combustion engine ENG side (from time T03 to time T04). Therefore, the total slip torque (absolute value) of the first and second engagement devices CL1 and CL2 does not exceed the maximum torque Tmgmx of the rotary electric machine MG, and the output torque from the rotary electric machine MG is controlled so as to be less than the maximum torque Tmgmx of the rotary electric machine MG (from time T03 to time T04).

In the case where the accelerator operation amount is large and the output torque from the rotary electric machine MG (slip torque of the second engagement device CL2) to be transferred to the wheel W side via the second engagement device CL2 is large as in the example illustrated in FIG. 3, an increase in engagement pressure of the first engagement device CL1 is restricted within the range of the extra torque, and an increase in magnitude of slip torque of the first engagement device CL1 is restricted. Therefore, there is a limit to the increase in rate at which the rotational speed of the internal combustion engine ENG is raised, and there is a limit to making the starting of the internal combustion engine ENG earlier. Meanwhile, the output torque from the rotary electric machine MG is not insufficient for the total slip torque of the first and second engagement devices CL1 and CL2. Thus, the rotational speed of the rotary electric machine MG has not been lowered, but is maintained at the target rotational speed (from time T03 to time T04). In such a comparative example, if it is attempted to secure early starting of the internal combustion engine ENG without restricting the magnitude of the slip torque of the first engagement device CL1, it is necessary to restrict the upper limit of the output torque from the rotary electric machine MG in the electric mode to be low in order to secure large extra torque. That is, torque that can be transferred from the rotary electric machine to the wheels in the electric mode must be brought to torque that is lower than maximum torque that can be output from the rotary electric machine by the torque required to start the internal combustion engine, and the torque region in which the electric mode is executable is set to be accordingly narrower.

<Timing Chart According to Embodiment>

Figure 4:
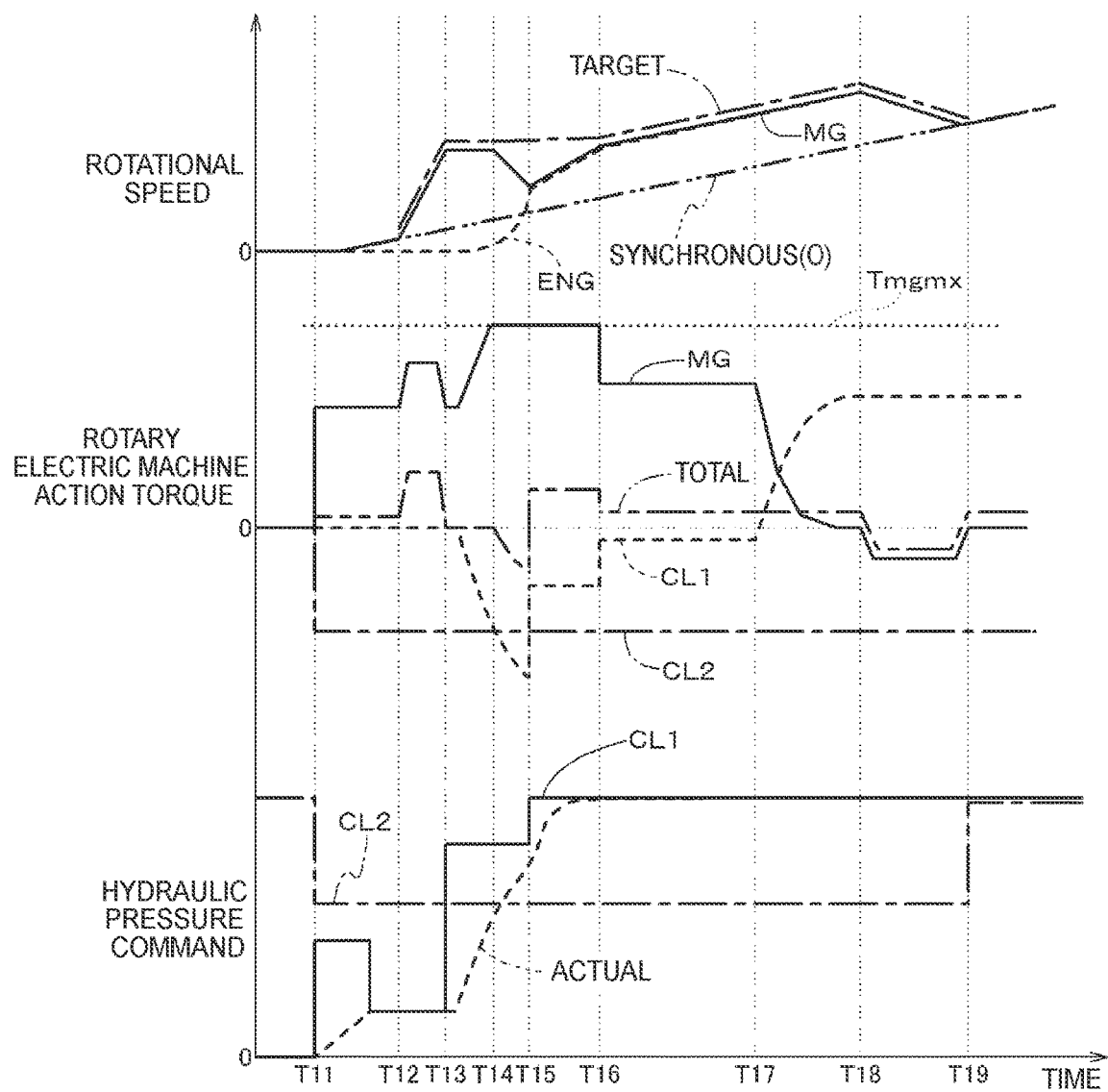
FIG. 4 is a timing chart illustrating the control behavior during starting control for an internal combustion engine according to the embodiment.

FIG. 4 illustrates a timing chart of the embodiment. In the embodiment, as described above, in first slipping engagement control, maximum torque excess control is executed time T13 to time T15), in which the engagement pressure of the first engagement device CL1 is controlled such that the first engagement device CL1 transfers torque that is larger than extra torque obtained by subtracting slip torque (absolute value) of the second engagement device CL2 from the maximum torque Tmgmx of the rotary electric machine MG from the rotary electric machine MG side to the internal combustion engine ENG side. Therefore, the total slip torque (absolute value) of the first and second engagement devices CL1 and CL2 exceeds the maximum torque Tmgmx of the rotary electric machine MG, and the output torque from the rotary electric machine MG is controlled so as to be around the maximum torque Tmgmx of the rotary electric machine MG (from time T14 to time T15).

In the example of FIG. 4, as in the example of FIG. 3, the accelerator operation amount is large, and the output torque from the rotary electric machine MG (the magnitude of the slip torque of the second engagement device CL2) to be transferred to the wheel W side via the second engagement device CL2 is large. In the example, however, the engagement pressure of the first engagement device CL1 has been increased beyond the range of the extra torque, and it is possible to increase the magnitude of the slip torque of the first engagement device CL1 compared to the case of the comparative example. Therefore, it is possible to increase the rate at which the rotational speed of the internal combustion engine ENG is raised compared to the case of the comparative example, which makes it is possible to make the starting of the internal combustion engine ENG earlier. From a different point of view, it is possible to reduce torque of the rotary electric machine MG which needs to be secured separately from torque to be transferred to the wheels W as torque required to start the internal combustion engine ENG, compared to the case of the comparative example. Consequently, it is possible to secure large torque that can be transferred from the rotary electric machine MG to the wheel W side during execution of the electric mode. Accordingly, it is possible to extend the torque region in which the electric mode is executable.

Meanwhile, the output torque from the rotary electric machine MG is insufficient for the total slip torque of the first and second engagement devices CL1 and CL2. Thus, the rotational speed of the rotary electric machine MG has been lowered from the target rotational speed (from time T14 to time T15). However, the starting control section 47 is configured to control the engagement pressure of the first engagement device CL1 within such a range that the rotational speed of the rotary electric machine MG can be maintained at a rotational speed that is higher than the synchronous rotational speed as described above. Thus, the rotational speed of the rotary electric machine MG is maintained at a rotational speed that is higher than the synchronous rotational speed, and the first engagement device CL1 is maintained in the slipping engagement state (from time T14 to time T16). When the rotational speed of the rotary electric machine MG is lowered to the rotational speed of the internal combustion engine ENG, the first engagement device CL1 transitions to the direct engagement state (time T15), and the rotational speed of the rotary electric machine MG stops lowering. After that, the rotational speeds of the internal combustion engine ENG and the rotary electric machine MG are raised together (from time T15 to time T16). In this way, the rotational speed of the rotary electric machine MG is lowered to the rotational speed of the internal combustion engine ENG through the maximum torque excess control.

Next, the acceleration starting control will be described in detail with reference to the exemplary timing chart illustrated in FIG. 4.

The starting control section 47 is configured to determine that a condition for starting the acceleration starting control has been established in the case where the drive mode is varied from the electric mode to the parallel mode with the accelerator operation amount increased to a determination operation amount or more, with the charge amount of the battery decreased to a determination charge amount or less, or the like in a state in which rotation of the internal combustion engine ENG has been stopped. In the example of FIG. 4, in the initial state before time T11, the vehicle speed and the rotational speed of the rotary electric machine MG are zero, rotation of the internal combustion engine ENG has been stopped, the first engagement device CL1 is in the disengaged state, and the second engagement device CL2 is in the direct engagement state. At time T11, the drive mode is varied from the electric mode to the parallel mode with the accelerator operation amount increased to the determination operation amount or more, and therefore the acceleration starting control is started. The starting control section 47 performs torque control in which the rotary electric machine required torque is set to torque that matches the vehicle required torque which has been increased by the increase in accelerator operation amount and the rotary electric machine MG is caused to output the torque that matches the vehicle required torque (in the example, torque that is equal to the vehicle required torque) (at and after time T11). After that, the vehicle speed (the rotational speed of the output shaft O, the synchronous rotational speed) starts increasing from zero.

After the acceleration starting control is started, the starting control section 47 starts the second slipping control in which the second engagement device CL2 is controlled to the slipping engagement state (at and after time T11). The starting control section 47 sets one of the plurality of engagement devices of the speed change device TM which are engaged to establish the target shift speed as the second engagement device CL2. Meanwhile, the starting control section 47 controls the plurality of engagement devices of the speed change device TM which are engaged to establish the target shift speed other than the second engagement device CL2 into the direct engagement state (not illustrated). The starting control section 47 lowers the engagement pressure of the second engagement device CL2 from a complete engagement pressure in order to cause the second engagement device CL2 to transition from the direct engagement state to the slipping engagement state. The term "complete engagement pressure" refers to an engagement pressure at which an engaged state without slipping can be maintained even if torque transferred from a drive force source to an engagement device is fluctuated. The starting control section 47 sets the hydraulic pressure command for the second engagement device CL2 in accordance with the vehicle required torque such that the slip torque transferred from the rotary electric machine MG side to the wheel W side via the second engagement device CL2 in the slipping engagement state becomes torque that matches the vehicle required torque (in the example, torque that is equal to the vehicle required torque) (from time T11 to time T19). In FIG. 4, for ease of understanding of the behavior of the rotational speed of the rotary electric machine MG, torque that acts on the inertia system of the rotary electric machine MG is indicated as rotary electric machine action torque. Here, the inertia system of the rotary electric machine MG refers to an inertia system of a rotary member that rotates together with the rotary electric machine MG in the case where the first engagement device CL1 and the second engagement device CL2 are in the slipping engagement state, and to an inertia system of a rotary member between the first engagement device CL1 and the second engagement device CL2.

The starting control section 47 starts the rotational speed control in which the rotary electric machine MG is controlled such that the rotational speed of the rotary electric machine MG is brought to a rotational speed that is higher than the synchronous rotational speed after it is determined that the second engagement device CL2 has transitioned to the slipping engagement state with the rotational speed difference between the rotational speed of the rotary electric machine MG and the synchronous rotational speed, which corresponds to the rotational speed difference of the second engagement device CL2, exceeding a determination value (from time T12 to time T19). The starting control section 47 is configured to perform feedback control, in which the output torque from the rotary electric machine MG (rotary electric machine required torque) is varied such that the rotational speed of the rotary electric machine MG is brought closer to the target rotational speed which is set to be higher than the synchronous rotational speed, in the rotational speed control. The synchronous rotational speed is a rotational speed of the rotary electric machine MG at which the second engagement device CL2 has no rotational speed difference. The starting control section 47 calculates the synchronous rotational speed by multiplying the rotational speed of the output shaft O by the speed ratio of a shift speed established in the speed change device TM. The starting control section 47 sets the target rotational speed for the rotary electric machine MG to be equal to or more than a rotational speed of the internal combustion engine ENG at which the internal combustion engine ENG can be started. In the embodiment, the starting control section 47 sets the target rotational speed for the rotary electric machine MG to be equal to or more than a rotational speed at which the internal combustion engine ENG can be started, and to be equal to or more than a rotational speed obtained by adding a target rotational speed difference set in advance to the synchronous rotational speed. After the rotational speed control is started, the starting control section 47 performs sweep up in which the target rotational speed is gradually increased from the synchronous rotational speed (from time T12 to time T13). In order to increase the rotational speed of the rotary electric machine MG, the output torque from the rotary electric machine MG is increased by an amount corresponding to inertia torque that matches the moment of inertia of a rotary member that rotates together with the rotary electric machine MG (from time T12 to time T13).

After the acceleration starting control is started, the starting control section 47 starts the first slipping control in which the first engagement device CL1 is controlled from the disengaged state to the slipping engagement state (at and after time T11). After the first slipping control is started, the starting control section 47 performs preliminary charge in which the engagement pressure of the first engagement device CL1 is increased to around a stroke end pressure (from time T11 to time T13). Immediately after the preliminary charge is started, the starting control section 47 temporarily increases the hydraulic pressure command for the first engagement device CL1 to be more than the stroke end pressure to speed up a rise in actual pressure. After the sweep up of the target rotational speed is ended and the rotational speed of the rotary electric machine MG is increased to the target rotational speed, the starting control section 47 increases the hydraulic pressure command for the first engagement device CL1 from the stroke end pressure to cause the first engagement device CL1 to transition to the slipping engagement state (at and after time T13).

The starting control section 47 increases the engagement pressure (hydraulic pressure command) of the first engagement device CL1 such that the first engagement device CL1 transfers torque that is larger than extra torque obtained by subtracting slip torque (absolute value) of the second engagement device CL2 from the maximum torque Tmgmx of the rotary electric machine MG from the rotary electric machine MG side to the internal combustion engine ENG side through the maximum torque excess control (from time T13 to time T15). Consequently, the starting control section 47 lowers the rotational speed of the rotary electric machine MG in the first slipping control. In the embodiment, as described above, the starting control section 47 is configured to increase the engagement pressure (hydraulic pressure command) of the first engagement device CL1 such that the magnitude of torque obtained by adding the allowable insufficient torque set in advance to extra torque obtained by subtracting the slip torque (absolute value) of the second engagement device CL2 from the maximum torque Tmgmx of the rotary electric machine MG is brought to the transfer torque capacity (slip torque) of the first engagement device CL1.

After a hydraulic pressure command for the first engagement device CL1 is increased stepwise at time T13, the actual engagement pressure (hydraulic pressure) of the first engagement device CL1 is increased with a delay, and the magnitude of the slip torque of the first engagement device CL1 is increased with a delay (from time T13 to time T15). When the magnitude of the slip torque of the first engagement device CL1 is increased, the rotational speed of the rotary electric machine MG is urged to be lowered. Therefore, the output torque from the rotary electric machine MG is increased so as to compensate for the increase in magnitude of the slip torque of the first engagement device CL1 through the rotational speed control (from time T13 to time T14). When the output torque from the rotary electric machine MG reaches the maximum torque Tmgmx at time T14, the output torque from the rotary electric machine MG which is increased is capped at the maximum torque Tmgmx. After that, the magnitude of the slip torque of the first engagement device CL1 is still increased. Thus, the output torque from the rotary electric machine MG is insufficient for the total slip torque of the first and second engagement devices CL1 and CL2, and the amount of the insufficiency is increased. Therefore, the total torque (more particularly, the total torque of the slip torque of the first engagement device CL1, the slip torque of the second engagement device CL2, and the output torque from the rotary electric machine MG) which acts on the inertia system of the rotary electric machine MG is lowered from zero, and the rotational speed of the rotary electric machine MG is lowered from the target rotational speed (from time T14 to time T15).

When the magnitude of the slip torque of the first engagement device CL1 is increased to exceed friction torque of the internal combustion engine ENG, meanwhile, the rotational speed of the internal combustion engine ENG is raised from zero (from time T13 to time T15). The magnitude of the slip torque of the first engagement device CL1 has been increased until the output torque from the rotary electric machine MG becomes insufficient. Thus, it is possible to increase the rate at which the rotational speed of the internal combustion engine ENG is raised, and to speed up the rise in rotational speed of the internal combustion engine ENG, compared to the case of the comparative example of FIG. 3. Since the rise in rotational speed of the internal combustion engine ENG has been sped up, it is possible to make the timing to start combustion start control for the internal combustion engine ENG such as fuel injection earlier, and to make the start of combustion of the internal combustion engine ENG earlier.

When the rotational speed of the rotary electric machine MG is lowered to the rotational speed of the internal combustion engine ENG which has been raised, the first engagement device CL1 has no rotational speed difference, and transitions to the direct engagement state (time T15). The starting control section 47 ends the first slipping control in the case where the rotational speed difference between the rotational speed of the rotary electric machine MG and the rotational speed of the internal combustion engine ENG has become equal to or less than a determination threshold, and increases the engagement pressure (hydraulic pressure command) of the first engagement device CL1 to the complete engagement pressure (at and after time T15). When the first engagement device CL1 transitions to the direct engagement state, the first engagement device CL1 does not transfer slip torque with the magnitude of the transfer torque capacity, but transfers predetermined torque within the range of the transfer torque capacity. Therefore, the magnitude of the transfer torque of the first engagement device CL1 is decreased. Specifically, torque obtained by distributing the total torque (specifically, torque obtained by subtracting the magnitude of the slip torque of the second engagement device CL2 etc. from the output torque from the rotary electric machine MG), which acts on the inertia system of the internal combustion engine ENG and the inertia system of the rotary electric machine MG which rotate together with each other, using the ratio between the moment of inertia of the inertia system of the internal combustion engine ENG and the moment of inertia of the inertia system of the rotary electric machine MG is transferred via the first engagement device CL1. After that, the rotational speeds of the internal combustion engine ENG and the rotary electric machine MG are raised together to the target rotational speed (from time T15 to time T16). When the rotational speed of the rotary electric machine MG is raised to the target rotational speed, the inertia torque of the internal combustion engine ENG and the rotary electric machine MG is decreased, and thus the output torque from the rotary electric machine MG is decreased from the maximum torque Tmgmx (from time T16 to time T17).

When combustion of the internal combustion engine ENG is started at time T17, the transfer torque of the first engagement device CL1 in the direct engagement state is increased in accordance with an increase in output torque from the internal combustion engine ENG (at and after time T17). When the transfer torque of the first engagement device CL1 is increased, the rotational speed of the rotary electric machine MG is urged to be raised. Therefore, the output torque from the rotary electric machine MG is decreased so as to compensate for the increase in transfer torque of the first engagement device CL1 through the rotational speed control (from time T17 to time T18). When the start of combustion of the internal combustion engine ENG is completed, the starting control section 47 performs sweep down in which the target rotational speed is gradually decreased to the synchronous rotational speed (from time T18 to time T19). After the rotational speed difference between the rotational speed of the rotary electric machine MG and the synchronous rotational speed has become equal to or less than the determination threshold, the starting control section 47 increases the engagement pressure (hydraulic pressure command) of the second engagement device CL2 to the complete engagement pressure, causes the second engagement device CL2 to transition to the direct engagement state, and ends the rotational speed control for the rotary electric machine MG. The starting control section 47 starts torque control in which the rotary electric machine MG is caused to output the rotary electric machine required torque which is calculated on the basis of the vehicle required torque etc. (at and after time T19). In addition, after combustion of the internal combustion engine ENG is started, the starting control section 47 performs torque control in which the internal combustion engine ENG is caused to output the internal combustion engine required torque which is calculated on the basis of the vehicle required torque etc. (at and after time T17). After the second engagement device CL2 is caused to transition to the direct engagement state, the starting control section 47 ends the acceleration starting control.

<Flowchart of Acceleration Starting Control>

Figure 5:
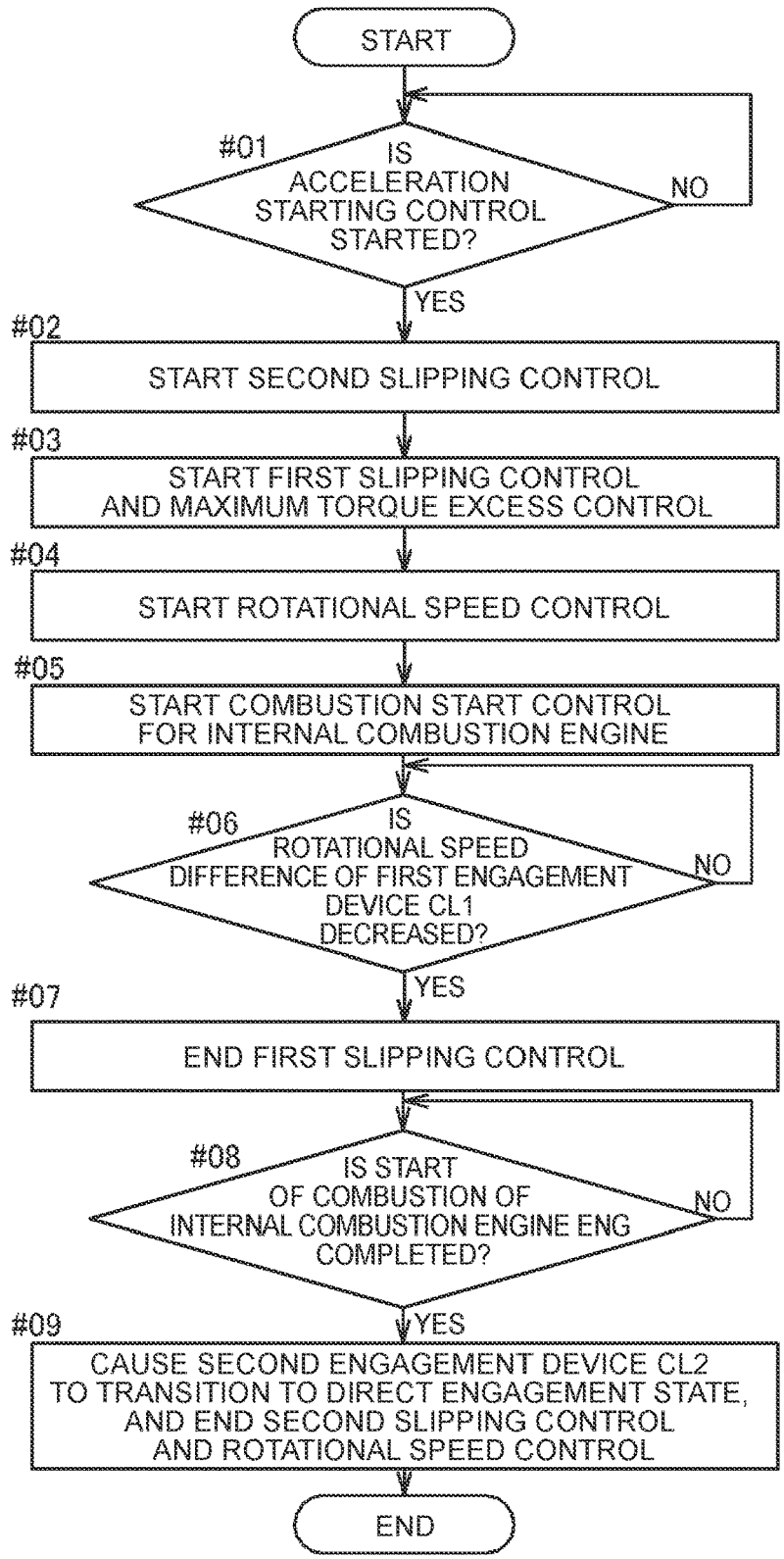
FIG. 5 is a flowchart illustrating processing of the starting control for the internal combustion engine according to the embodiment.

Next, the processing of the acceleration starting control will be described with reference to the flowchart of FIG. 5.

First, in step #01, the starting control section 47 determines whether or not the condition for starting the acceleration starting control is met as described above. In the case where it is determined that the starting condition is met (step #01: Yes), the starting control section 47 starts a sequence of the acceleration starting control. After the acceleration starting control is started, the starting control section 47 starts the second slipping control in which the second engagement device CL2 is controlled to the slipping engagement state as described above (step #02). The starting control section 47 also starts the first slipping control, in which the first engagement device CL1 is controlled from the disengaged state into the slipping engagement state, and the maximum torque excess control (step #03). After the second slipping control is started, the starting control section 47 also starts the rotational speed control for the rotary electric machine MG as described above (step #04). After the first slipping control is started, the starting control section 47 starts the combustion start control for the internal combustion engine ENG (step #05). In the case where the rotational speed difference of the first engagement device CL1 is decreased (step #06: Yes), the starting control section 47 ends the first slipping control, and causes the first engagement device CL1 to transition to the direct engagement state (step #07). In the case where it is determined that the start of combustion of the internal combustion engine ENG is completed (step #08: Yes), the starting control section 47 causes the second engagement device CL2 to transition to the direct engagement state, ends the second slipping control and the rotational speed control (step #09), and ends the acceleration starting control.

2. Other Embodiments

Next, other embodiments will be described. The configuration of each embodiment described below is not limited to its independent application, and may be applied in combination with the configuration of other embodiments unless any contradiction occurs.

Figure 6:
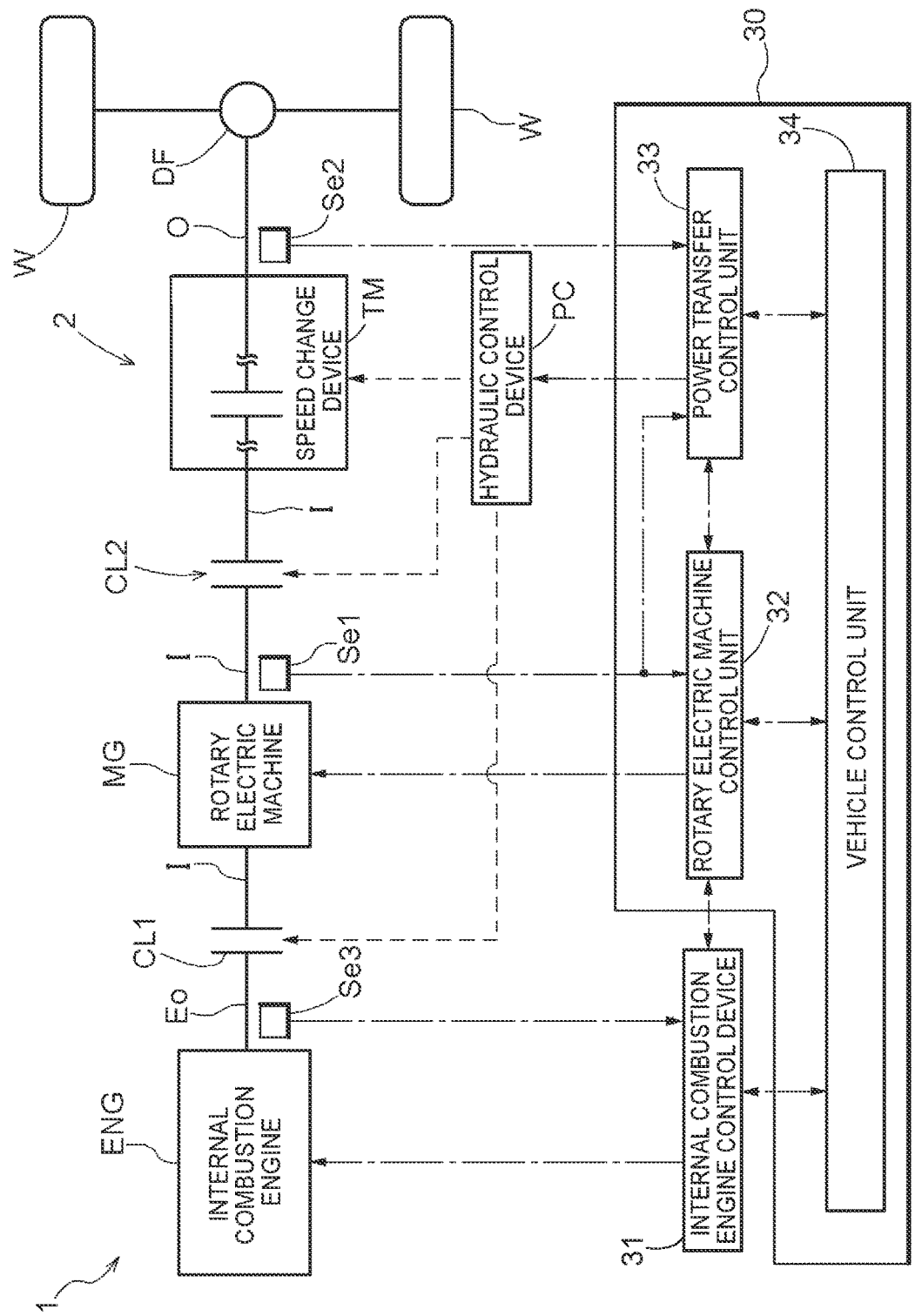
FIG. 6 is a schematic diagram illustrating a schematic configuration of a vehicle drive device and a control device according to another embodiment.

(1) In the embodiment described above, one of the plurality of engagement devices of the speed change device TM is set as the second engagement device CL2. However, the present disclosure is not limited thereto. That is, as illustrated in FIG. 6, the vehicle drive device 1 may further include an engagement device provided in a portion of the power transfer path 2 between the rotary electric machine MG and the speed change device TM, and the engagement device may be set as the second engagement device CL2. Alternatively, the vehicle drive device 1 may further include an engagement device provided in a portion of the power transfer path 2 between the speed change device TM and the wheels W, and the engagement device may be set as the second engagement device CL2. Alternatively, the vehicle drive device 1 illustrated in FIG. 6 may be configured not to include the speed change device TM.

Figure 7:
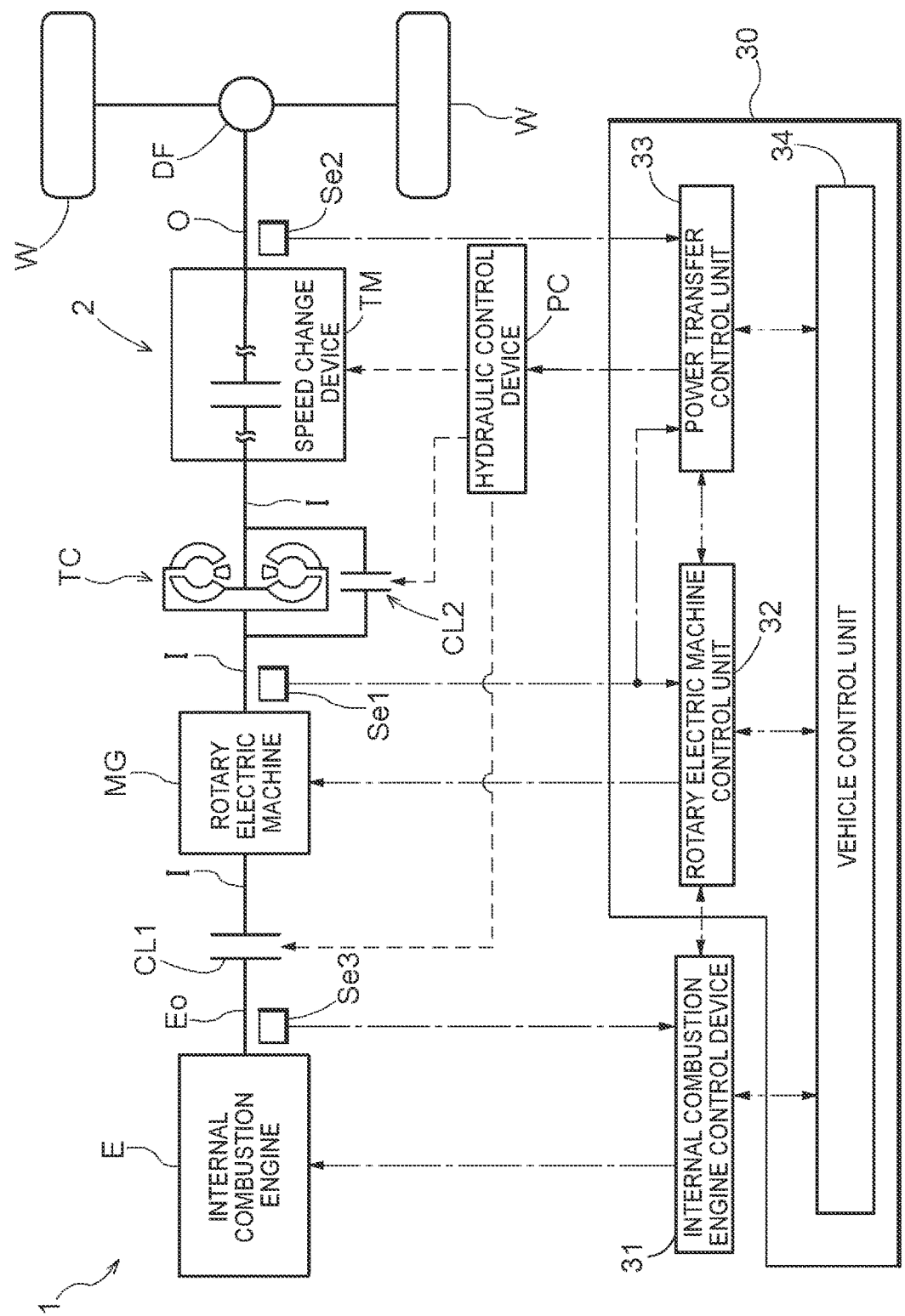
FIG. 7 is a schematic diagram illustrating a schematic configuration of a vehicle drive device and a control device according to still another embodiment.

Alternatively, as illustrated in FIG. 7, the vehicle drive device 1 may further include a torque converter TC provided in a portion of the power transfer path 2 between the rotary electric machine MG and the speed change device TM, and a lock-up clutch that brings input and output members of the torque converter TC into a direct engagement state may be set as the second engagement device CL2.

(2) In the embodiment described above, the first engagement device CL1 and the second engagement device CL2 are each an engagement device that is controlled in accordance with a hydraulic pressure. However, the present disclosure is not limited thereto. That is, one or both of the first engagement device CL1 and the second engagement device CL2 may be an engagement device that is controlled in accordance with a drive force other than a hydraulic pressure such as a drive force of an electromagnet or a drive force of a servomotor, for example.

(3) In the embodiment described above, speed change device TM is a stepped automatic speed change device. However, the present disclosure is not limited thereto. That is, the speed change device TM may be a speed change device other than a stepped automatic speed change device, such as a continuously variable automatic speed change device capable of continuously changing the speed ratio. In this case as well, an engagement device provided in the speed change device TM may be set as the second engagement device CL2 whose engagement state is controlled during the starting control for the internal combustion engine ENG, or an engagement device provided separately from the speed change device TM may be set as the second engagement device CL2.

(4) In the embodiment described above, the second engagement device CL2 is a clutch. However, the present disclosure is not limited thereto. That is, the second engagement device CL2 may be a brake. In this case, the first rotary member R1 may be any rotary member that is closer to the rotary electric machine MG than a member, rotation of which is selectively stopped by the second engagement device CL2, with no other engagement device interposed between the second engagement device CL2 and the first rotary member R1. Similarly, the second rotary member R2 may be any rotary member that is closer to the wheels W than a member, rotation of which is selectively stopped by the second engagement device CL2, with no other engagement device interposed between the second engagement device CL2 and the second rotary member R2.

(5) In the embodiment described above, the control device 30 includes the plurality of control units 32 to 34, and the plurality of control units 32 to 34 include the plurality of functional sections 41 to 47 in a distributed manner. However, the present disclosure is not limited thereto. That is, the control device 30 may include the plurality of control units 32 to 34 discussed above as control devices integrated or separated in any combination. The plurality of functional sections 41 to 47 may also be distributed in any combination.

(6) In the embodiment described above, the starting control section 47 increases the output torque from the rotary electric machine MG to the maximum torque Tmgmx during execution of the maximum torque excess control. However, the present disclosure is not limited thereto. That is, the starting control section 47 may be configured to increase the output torque from the rotary electric machine MG to torque that is smaller than the maximum torque Tmgmx during execution of the maximum torque excess control.

(7) In the embodiment described above, in the exemplary timing chart of FIG. 4, the initial condition before the acceleration starting control is started is that the vehicle is stationary (rotation of the wheels W has been stopped). However, the present disclosure is not limited thereto. For example, the initial condition before the acceleration starting control is started may be that the vehicle is traveling (the wheels W are rotating) using the output torque from the rotary electric machine MG with the drive mode set to the electric mode, with the first engagement device CL1 in the disengaged state, with rotation of the internal combustion engine ENG stopped, and with the second engagement device CL2 in the direct engagement state.

(8) In the embodiment described above, the first engagement device CL1 is configured such that the transfer torque capacity (engagement pressure) of the first engagement device CL1 is increased by increasing the supply hydraulic pressure (hydraulic pressure command). However, the present disclosure is not limited thereto. That is, the first engagement device CL1 may be configured such that the transfer torque capacity (engagement pressure) of the first engagement device CL1 is increased by decreasing the supply hydraulic pressure (hydraulic pressure command). In this case, for example, the first engagement device CL1 may be urged toward the engagement side by a return spring, and pressed toward the disengagement side by a hydraulic pressure supplied to the first engagement device CL1. In this case, the starting control section 47 is configured to increase the engagement pressure of the first engagement device CL1 by decreasing the supply hydraulic pressure (hydraulic pressure command) for the first engagement device CL1 in the first slipping control.

3. Overview of Above Embodiments

The embodiments described above include at least the following configuration.

A control device (30) that controls a vehicle drive device (1) in which a first engagement device (CL1), a rotary electric machine (MG), and a second engagement device (CL2) are provided in a power transfer path (2) that connects between an internal combustion engine (ENG) and wheels (W) and arranged in this order from an internal combustion engine (ENG) side, in which when the internal combustion engine (ENG) is started by the rotary electric machine (MG) while output torque from the rotary electric machine (MG) is transferred to the wheels (W) in a state in which rotation of the internal combustion engine (ENG) has been stopped, the control device (30) executes second slipping control in which the second engagement device (CL2) is controlled into a slipping engagement state, executes first slipping control in which the first engagement device (CL1) which has been in a disengaged state is controlled into a slipping engagement state during execution of the second slipping control, and controls an engagement pressure of the first engagement device (CL1) so as to lower a rotational speed of the rotary electric machine (MG) in the first slipping control.

With such a configuration, the rotational speed of the rotary electric machine (MG) is lowered through the first slipping control during execution of the second slipping control. Inertia torque as a reaction force against the reduction in rotational speed of the rotary electric machine (MG) is transferred to the internal combustion engine (ENG) side via the first engagement device (CL1). That is, torque that is larger than the output torque from the rotary electric machine (MG) can be transferred to the internal combustion engine (ENG) side by converting the rotational energy of the rotary electric machine (MG) into torque and transferring the torque to the internal combustion engine (ENG) side. Thus, it is possible to accordingly reduce torque of the rotary electric machine (MG) which needs to be secured separately from torque to be transferred to the wheels (W) as torque required to start the internal combustion engine (ENG). Consequently, it is possible to secure large torque that can be transferred from the rotary electric machine (MG) to a wheel (W) side during execution of the electric mode (EV mode). Accordingly, it is possible to extend the torque region in which the electric mode is executable.

Preferably, the engagement pressure of the first engagement device (CL1) is controlled in the first slipping control such that the first engagement device (CL1) transfers torque from the rotary electric machine (MG) side to the internal combustion engine (ENG) side. The torque is preferably larger than torque obtained by subtracting transfer torque to be transferred from a rotary electric machine (MG) side to a wheel (W) side via the second engagement device (CL2) from maximum torque (Tmgmx) that can be output from the rotary electric machine (MG).

With this configuration, the total transfer torque of the transfer torque which is transferred from the rotary electric machine (MG) side to the internal combustion engine (ENG) side via the first engagement device (CL1) in the slipping engagement state and the transfer torque which is transferred from the rotary electric machine (MG) side to the wheel (W) side via the second engagement device (CL2) in the slipping engagement state exceeds the maximum torque (Tmgmx) of the rotary electric machine (MG), which makes the output torque from the rotary electric machine (MG) insufficient. Thus, the engagement pressure of the first engagement device (CL1) is controlled so as to lower the rotational speed of the rotary electric machine (MG) in the first slipping control. Consequently, inertia torque as a reaction force against the reduction in rotational speed of the rotary electric machine (MG) can be transferred to the internal combustion engine (ENG) side.

Preferably, the engagement pressure of the first engagement device (CL1) is controlled within a range in which the second engagement device (CL2) can be maintained in the slipping engagement state in the first slipping control.

With this configuration, it is possible to suppress transition of the second engagement device (CL2) to the direct engagement state with the rotational speed of the rotary electric machine (MG) lowered by an increase in engagement pressure of the first engagement device (CL1). Hence, it is possible to suppress transfer of a torque shock to the wheels (W) with the second engagement device CL2 transitioning to the direct engagement state.

Preferably, the control device executes rotational speed control in which the rotary electric machine (MG) is controlled such that the rotational speed of the rotary electric machine (MG) is brought closer to a target rotational speed that is higher than a synchronous rotational speed which is a rotational speed of the rotary electric machine (MG) at which the second engagement device (CL2) has no rotational speed difference during execution of the second slipping control, and the target rotational speed is set to be equal to or more than a rotational speed of the internal combustion engine (ENG) at which the internal combustion engine (ENG) can be started.

With this configuration, the internal combustion engine (ENG) can be started by finally raising the rotational speed of the rotary electric machine (MG) to a rotational speed at which the internal combustion engine (ENG) can be started even if the rotational speed of the rotary electric machine (MG) is temporarily lowered to be less than the rotational speed at which the internal combustion engine (ENG) can be started because of an increase in engagement pressure of the first engagement device (CL1).

INDUSTRIAL APPLICABILITY

The technology according to the present disclosure is suitably applicable to a control device that controls a vehicle drive device in which a first engagement device, a rotary electric machine, and a second engagement device are provided in a power transfer path that connects between an internal combustion engine and wheels and arranged in this order from an internal combustion engine side.

The invention claimed is:

1. A control device that controls a vehicle drive device in which a first engagement device, a rotary electric machine, and a second engagement device are provided in a power transfer path that connects between an internal combustion engine and wheels and arranged in this order from an internal combustion engine side, the control device comprising:
    an electronic control unit that is programmed such that, when the internal combustion engine is started by the rotary electric machine while output torque from the rotary electric machine is transferred to the wheels in a state in which rotation of the internal combustion engine has been stopped, the electronic control unit:
    executes second slipping control in which the second engagement device is controlled into a slipping engagement state,
    executes first slipping control in which the first engagement device which has been in a disengaged state is controlled into a slipping engagement state during execution of the second slipping control, and
    controls an engagement pressure of the first engagement device so as to lower a rotational speed of the rotary electric machine in the first slipping control, wherein:
    during execution of the first slipping control, the rotary electric machine outputs a maximum torque that the rotary electric machine can output, and
    the control of the engagement pressure of the first engagement device in the first slipping control is based on a torque transmitted from a rotary electric machine side to the internal combustion engine side via the first engagement device and a torque transmitted from the wheel to control the engagement pressure of the first engagement device so that a total value of the torque transmitted to the first engagement device and the torque transmitted to the second engagement device exceeds the maximum torque that the rotary electric machine can output.

2. The control device for a vehicle drive device according to claim 1, wherein
    the electronic control unit controls the engagement pressure of the first engagement device in the first slipping control such that the first engagement device transfers the torque from the rotary electric machine side to the internal combustion engine side, the torque being larger than torque obtained by subtracting transfer torque to be transferred from the rotary electric machine side to a wheel side via the second engagement device from maximum torque that is output from the rotary electric machine.

3. The control device for a vehicle drive device according to claim 2, wherein
    the electronic control unit controls the engagement pressure of the first engagement device within a range in which the second engagement device is maintained in the slipping engagement state in the first slipping control.

4. The control device for a vehicle drive device according to claim 3, wherein
    the electronic control unit executes rotational speed control in which the rotary electric machine is controlled such that the rotational speed of the rotary electric machine is brought to a target rotational speed that is higher than a synchronous rotational speed which is a rotational speed of the rotary electric machine at which the second engagement device has no rotational speed difference during execution of the second slipping control, and
    the electronic control unit sets the target rotational speed to be equal to or more than a rotational speed of the internal combustion engine at which the internal combustion engine is started.

5. The control device for a vehicle drive device according to claim 2, wherein
    the electronic control unit executes rotational speed control in which the rotary electric machine is controlled such that the rotational speed of the rotary electric machine is brought to a target rotational speed that is higher than a synchronous rotational speed which is a rotational speed of the rotary electric machine at which the second engagement device has no rotational speed difference during execution of the second slipping control, and
    the electronic control unit sets the target rotational speed to be equal to or more than a rotational speed of the internal combustion engine at which the internal combustion engine is started.

6. The control device for a vehicle drive device according to claim 1, wherein
    the electronic control unit controls the engagement pressure of the first engagement device within a range in which the second engagement device is maintained in the slipping engagement state in the first slipping control.

7. The control device for a vehicle drive device according to claim 6, wherein the electronic control unit executes rotational speed control in which the rotary electric machine is controlled such that the rotational speed of the rotary electric machine is brought to a target rotational speed that is higher than a synchronous rotational speed which is a rotational speed of the rotary electric machine at which the second engagement device has no rotational speed difference during execution of the second slipping control, and the electronic control unit sets the target rotational speed to be equal to or more than a rotational speed of the internal combustion engine at which the internal combustion engine is started.

8. The control device for a vehicle drive device according to claim 1, wherein the electronic control unit executes rotational speed control in which the rotary electric machine is controlled such that the rotational speed of the rotary electric machine is brought to a target rotational speed that is higher than a synchronous rotational speed which is a rotational speed of the rotary electric machine at which the second engagement device has no rotational speed difference during execution of the second slipping control, and the electronic control unit sets the target rotational speed to be equal to or more than a rotational speed of the internal combustion engine at which the internal combustion engine is started.

* * * * *